(12) United States Patent
Lenahan et al.

(10) Patent No.: US 11,188,948 B2
(45) Date of Patent: Nov. 30, 2021

(54) GENERATING PRODUCT LISTINGS USING LOCKER SENSOR DATA AND RECONFIGURING LOCKERS BASED ON PRODUCT SIZE

(71) Applicant: eBay Inc., San Jose, CA (US)

(72) Inventors: Michael George Lenahan, Moraga, CA (US); Chahn Chung, San Francisco, CA (US); Myra Sandoval, San Francisco, CA (US); Ben Lucas Mitchell, Oakland, CA (US); Timothy Sean Suglian, San Francisco, CA (US)

(73) Assignee: eBay Inc., San Jose, CA (US)

( * ) Notice: Subject to any disclaimer, the term of this patent is extended or adjusted under 35 U.S.C. 154(b) by 297 days.

(21) Appl. No.: 15/837,675

(22) Filed: Dec. 11, 2017

(65) Prior Publication Data

US 2018/0232771 A1   Aug. 16, 2018

Related U.S. Application Data

(63) Continuation of application No. 14/466,857, filed on Aug. 22, 2014, now Pat. No. 9,842,351.
(Continued)

(51) Int. Cl.
*G06Q 30/06* (2012.01)
*G06Q 30/02* (2012.01)
(Continued)

(52) U.S. Cl.
CPC ......... *G06Q 30/0267* (2013.01); *E05B 47/00* (2013.01); *G06F 16/9535* (2019.01);
(Continued)

(58) Field of Classification Search
USPC ....................................................... 705/26.8
See application file for complete search history.

(56) References Cited

U.S. PATENT DOCUMENTS

| 5,158,155 A | 10/1992 | Domain et al. |
| 6,546,309 B1 | 4/2003 | Gazzuolo |
| (Continued) | | |

FOREIGN PATENT DOCUMENTS

WO   2008/144681 A1   11/2008

OTHER PUBLICATIONS

H. Locker, M. Davis, J. Hunt, and J. Nicholson, "Item Inventory Using Existing Barcodes" in The IP.com Journal, Feb. 2012. https://priorart.ip.com/IPCOM/000215431 (Year: 2012).*

(Continued)

*Primary Examiner* — Michelle T Kringen
(74) *Attorney, Agent, or Firm* — Schwegman Lundberg & Woessner, P.A.

(57) ABSTRACT

Systems and methods are presented for standardizing delivery of products in an online marketplace using one or more locker systems. In some embodiments, a system of lockers is presented. The locker system may be configured to store one or more products sold in an online marketplace. The locker system may also include a processor coupled to the one or more lockers and configured to generate access code information for a buyer to enable access to a locker storing the product. One or more sensors may be coupled to the one or more lockers and configured to examine the product for a level of product quality. A transmitter of the system may be configured to transmit the access code information to the buyer. The system can later accept the access code information inputted from the buyer and open the locker storing the product after receiving the access code information.

19 Claims, 8 Drawing Sheets

Related U.S. Application Data

(60) Provisional application No. 61/869,557, filed on Aug. 23, 2013.

(51) Int. Cl.
  *G06F 16/9535* (2019.01)
  *H04L 12/58* (2006.01)
  *G06Q 20/32* (2012.01)
  *G07C 9/30* (2020.01)
  *E05B 47/00* (2006.01)
  *G07F 7/02* (2006.01)
  *G06Q 50/00* (2012.01)
  *H04L 29/08* (2006.01)

(52) U.S. Cl.
  CPC ..... *G06Q 20/3224* (2013.01); *G06Q 30/0255* (2013.01); *G06Q 30/0261* (2013.01); *G06Q 30/0282* (2013.01); *G06Q 30/0623* (2013.01); *G06Q 30/0631* (2013.01); *G06Q 30/0633* (2013.01); *G06Q 50/01* (2013.01); *G07C 9/30* (2020.01); *G07F 7/02* (2013.01); *H04L 51/02* (2013.01); *H04L 67/10* (2013.01); *E05B 2047/0054* (2013.01); *H04L 51/32* (2013.01)

(56) References Cited

U.S. PATENT DOCUMENTS

| | | | |
|---|---|---|---|
| 6,694,217 B2 | 2/2004 | Bloom | |
| 6,961,711 B1 | 11/2005 | Chee | |
| 7,257,552 B1 | 8/2007 | Franco | |
| 7,698,240 B1 | 4/2010 | Chatterjee et al. | |
| 7,873,549 B1* | 1/2011 | Mishra | G06Q 10/087 705/28 |
| 8,346,626 B2 | 1/2013 | Robertson | |
| 8,542,906 B1 | 9/2013 | Persson et al. | |
| 8,606,645 B1 | 12/2013 | Applefeld | |
| 8,666,836 B2 | 3/2014 | Adams | |
| 8,782,691 B1 | 7/2014 | Noble et al. | |
| 8,827,095 B1 | 9/2014 | Sackett | |
| 9,324,107 B2 | 4/2016 | Roa et al. | |
| 9,842,351 B2 | 12/2017 | Lenahan et al. | |
| 2002/0003388 A1 | 1/2002 | Previte | |
| 2002/0099642 A1* | 7/2002 | Schwankl | G06Q 30/0601 705/37 |
| 2002/0178074 A1 | 11/2002 | Bloom | |
| 2006/0020366 A1* | 1/2006 | Bloom | B07C 3/02 700/226 |
| 2007/0286358 A1 | 12/2007 | Pomerantz et al. | |
| 2008/0266128 A1 | 10/2008 | Leone et al. | |
| 2009/0012865 A1 | 1/2009 | Celik | |
| 2009/0024402 A1* | 1/2009 | Delingat | G06Q 30/04 705/310 |
| 2009/0164132 A1 | 6/2009 | Jung et al. | |
| 2010/0169175 A1 | 7/2010 | Koran | |
| 2010/0217678 A1* | 8/2010 | Goncalves | G06Q 20/203 705/22 |
| 2011/0238512 A1 | 9/2011 | Doty et al. | |
| 2012/0142322 A1 | 6/2012 | Gomez | |
| 2012/0223131 A1 | 9/2012 | Lim et al. | |
| 2013/0041761 A1 | 2/2013 | Voda | |
| 2013/0046594 A1 | 2/2013 | Davidson | |
| 2013/0110678 A1 | 5/2013 | Vigier et al. | |
| 2013/0124361 A1 | 5/2013 | Bryson | |
| 2013/0151343 A1 | 6/2013 | Phan | |
| 2013/0229261 A1 | 9/2013 | Gates et al. | |
| 2013/0262252 A1 | 10/2013 | Lakshman et al. | |
| 2013/0325594 A1 | 12/2013 | Mehta | |
| 2014/0035913 A1 | 2/2014 | Higgins et al. | |
| 2014/0059124 A1 | 2/2014 | Song et al. | |
| 2014/0114875 A1* | 4/2014 | Murthy | G07C 9/00166 705/339 |
| 2014/0121967 A1 | 5/2014 | Anbalagan et al. | |
| 2014/0122201 A1 | 5/2014 | Johnson | |
| 2014/0279015 A1 | 9/2014 | Root et al. | |
| 2014/0330603 A1* | 11/2014 | Corder | G06Q 10/0631 705/7.12 |
| 2015/0058123 A1 | 2/2015 | Lenahan et al. | |
| 2015/0058142 A1 | 2/2015 | Lenahan et al. | |
| 2015/0058163 A1 | 2/2015 | Lenahan et al. | |
| 2015/0058239 A1 | 2/2015 | Lenahan et al. | |
| 2015/0332362 A1* | 11/2015 | Kalt | G06Q 30/0609 705/26.4 |
| 2016/0253761 A1 | 9/2016 | Davey et al. | |

OTHER PUBLICATIONS

U.S. Appl. No. 14/465,786, filed Aug. 21, 2014 Contextually Aware Interactive Advertisements.
U.S. Appl. No. 14/465,710, filed Aug. 21, 2014 Store-Integrated Tablet.
U.S. Appl. No. 14/466,857 U.S. Pat. No. 9,842,351, filed Aug. 22, 2014 Standardized Shipping.
Non-Final Office Action received for U.S. Appl. No. 14/465,786, dated Jun. 12, 2019, 25 pages.
"Scenarios and Concepts", preVIZ, Dec. 2012, 82 pages.
Applicant Initiated Interview Summary Received for U.S. Appl. No. 14/465,786 dated Apr. 18, 2018, 2 pages.
Non-Final Office Action received for U.S. Appl. No. 14/465,786, dated Aug. 13, 2018, 27 pages.
Response to Non Compliant Amendment filed on Apr. 30, 2018, for U.S. Appl. No. 14/465,786, dated Feb. 28, 2018, 13 pages.
Response to Non-Final Office Action filed on Jan. 29, 2018 for U.S. Appl. No. 14/465,786, dated Oct. 31, 2017, 17 pages.
Lenahan, et al., "Retail in the Land of OZ", preVIZ, Mar. 2013, 56 pages.
Examiner Initiated Interview Summary received for U.S. Appl. No. 14/466,857, dated Aug. 4, 2017, 2 pages.
Non-Final Office Action received for U.S. Appl. No. 14/465,786, dated Oct. 31, 2017, 31 pages.
Applicant Initiated Interview Summary received for U.S. Appl. No. 14/465,786, dated Nov. 8, 2018, 2 pages.
Response to Final Office Action filed on Nov. 13, 2018, for U.S. Appl. No. 14/465,786, dated Aug. 13, 2018, 21 pages.
Applicant Initiated Interview Summary received for U.S. Appl. No. 14/465,786, dated Feb. 12, 2019, 3 pages.
Final Office Action received for U.S. Appl. No. 14/465,710, dated May 22, 2017, 14 pages.
Non-Final Office Action received for U.S. Appl. No. 14/465,710, dated Nov. 1, 2016, 19 pages.
Response to Final Office Action filed on Aug. 22, 2017, for U.S. Appl. No. 14/465,710, dated May 22, 2017, 11 pages.
Response to Non-Final Office Action filed on Mar. 1, 2017, for U.S. Appl. No. 14/465,710, dated Nov. 1, 2016, 12 pages.
Advisory Action received for U.S. Appl. No. 14/465,786, dated Sep. 5, 2017, 4 pages.
Final Office Action received for U.S. Appl. No. 14/465,786, dated Jun. 26, 2017, 31 pages.
Non-Final Office Action received for U.S. Appl. No. 14/465,786, dated Sep. 22, 2016, 49 pages.
Shopify Ecommerce Software, "Website Store Hosting Solution", Retrieved from the Internet URL: <https://web.archive.org/web/20130708142815/https://www.shopify.com>, Jul. 8, 2013, 5 pages.
Lawrence, "How to Take Gorgeous Product Photos", Retrieved from the Internet URL:<http://www.practicalecommerce.com/HowtoTakeGorgeousProductPhotos>, Jan. 28, 2013, 5 pages.
Response to Non-Final Office Action filed on Apr. 20, 2017, for U.S. Appl. No. 14/466,857, dated Jan. 20, 2017, 19 pages.
Notice of Allowance received for U.S. Appl. No. 14/466,857, dated Aug. 4, 2017, 21 pages.
Non-Final Office Action received for U.S. Appl. No. 14/466,857, dated Jan. 20, 2017, 36 pages.
U.S. Appl. No. 14/465,786, Examiner Interview Summary dated Apr. 18, 2017, 3 pages.
U.S. Appl. No. 14/465,710, Non Final Office Action dated Mar. 26, 2018, 15 pages.

(56) References Cited

OTHER PUBLICATIONS

U.S. Appl. No. 14/465,786, Response filed Mar. 22, 2017 to Non Final Office Action dated Sep. 22, 2016, 21 pages.
U.S. Appl. No. 14/465,786, Response filed Aug. 25, 2017 to Final Office Action dated Jun. 26, 2017, 22 pages.
U.S. Appl. No. 14/465,786, Response filed Sep. 25, 2017 to Advisory Action dated Sep. 5, 2017, 21 pages.

* cited by examiner

GENERATING PRODUCT LISTINGS USING LOCKER SENSOR DATA AND RECONFIGURING LOCKERS BASED ON PRODUCT SIZE

CROSS REFERENCE TO RELATED APPLICATION

This application is a continuation of U.S. application Ser. No. 14/466,857, filed Aug. 22, 2014, which claims the benefit of U.S. Provisional Application 61/869,557, filed Aug. 23, 2013, each of which is hereby incorporated by reference in its entirety.

TECHNICAL FIELD

The subject matter disclosed herein generally relates to publication systems. In some example embodiments, the present disclosures relate to systems and methods for providing standardized shipping of products through a locker system.

BRIEF DESCRIPTION OF THE DRAWINGS

Some embodiments are illustrated by way of example and not limitation in the figures of the accompanying drawings.

DETAILED DESCRIPTION

While a publication system, such as an online marketplace system may interact with many merchants to sell the merchants' wares in the online marketplace, the online marketplace often does little to facilitate, manage, or monitor the interactions between the merchant and the buyer beyond what takes place in an online website. However, the online marketplace system ultimately may want to ensure that the buyer has a satisfying enough experience shopping online such that the buyer would feel confident and comfortable in using the online marketplace system again. Thus, the online marketplace may have an interest in trying to facilitate and manage as much of the product transaction process as possible.

For example, the online marketplace system may have an interest in ensuring that products bought and sold online not only successfully arrive in the buyer's hands, but that the products are of good and sufficient quality such that the online marketplace system would feel confident in continuing to do business with the particular merchant. In addition, the online marketplace system may want to provide more standardized or uniform shipping procedures, at least as a way of improving quality control across multiple merchant affiliates.

Aspects of the present disclosure are presented for providing standardized shipping for merchants and buyers through the use of a locker system associated with an online marketplace system. In some example embodiments, a system of lockers may be configured to allow sellers of products or agents of the sellers to place purchased products securely in one or more spaces in the system of lockers. In some example embodiments, the products can be monitored and examined while in the locker or when about to be entered into the locker to provide quality control and to monitor more of the transaction process. In some example embodiments, the system of lockers can be configurable in size and dimension through a series of locked panels controlled by the locker system. In some example embodiments, product listings associated with the online marketplace system can be conducted in the locker system, allowing the product to be controlled in the locker system and to provide convenience and quality control for the seller's products. In some example embodiments, the buyer can specify a location of the locker system among multiple locker systems in which to place the purchased product, thereby allowing the buyer to manage where the product will be delivered to without needing to wait to sign for a courier.

Figure 1:
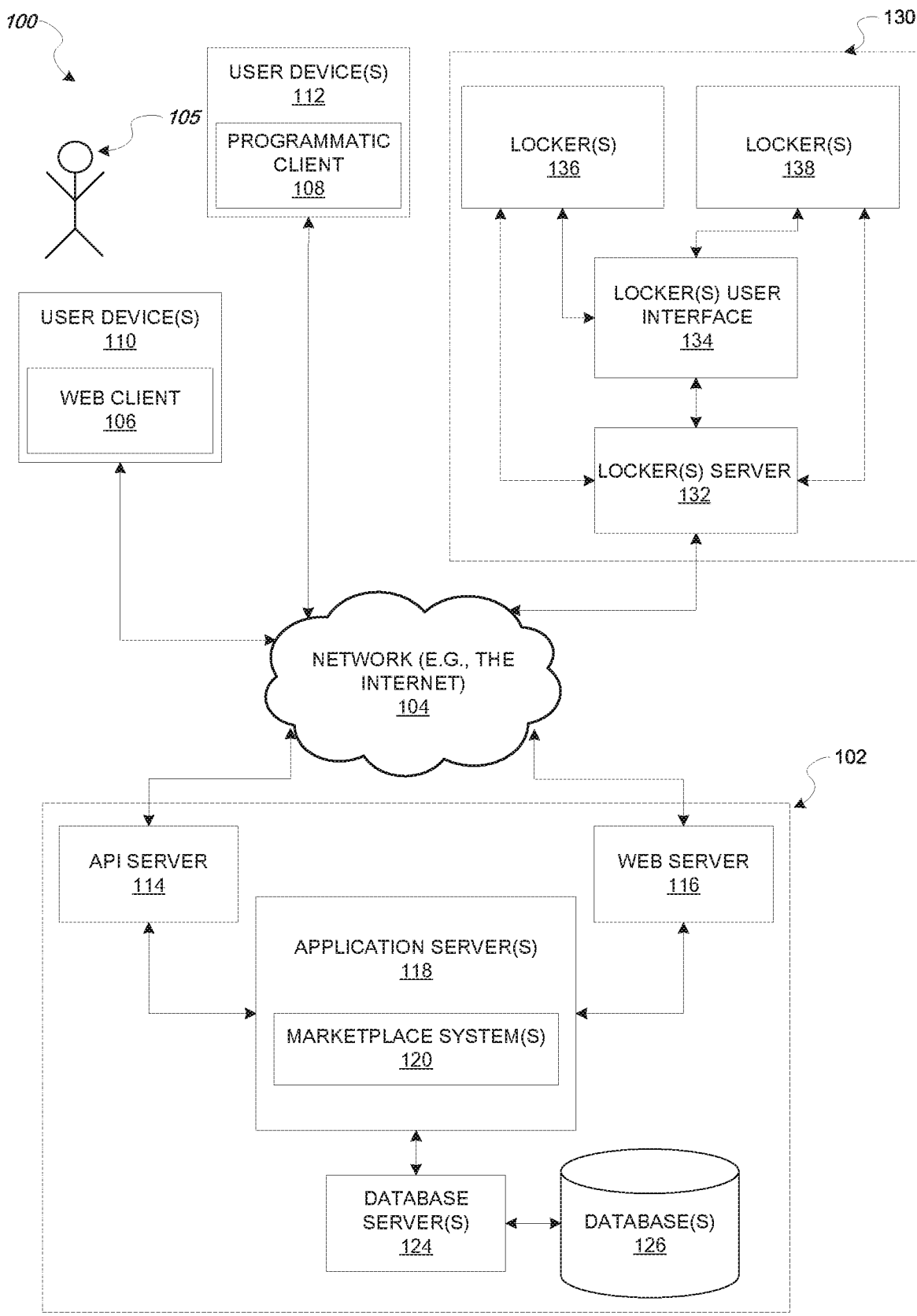
FIG. 1 is block diagram illustrating a network architecture of a publication system in an example form of an online marketplace including a system of lockers, according to some example embodiments.

Referring to FIG. 1, a high-level block diagram of a network architecture 100 is shown, according to some example embodiments. The network architecture 100 may include systems, applications, modules, and/or other means for utilizing aspects of the present disclosures, as may be apparent to those with skill in the art.

For example, the network architecture 100 may include one or more locker systems 130. The one or more locker systems 130 can include one or more lockers 136 and 138, which can be configured to hold products and have other properties typical of a locker. The lockers 136 and 138 can also include one or more image recording modules, such as a camera, for examining contents inside the lockers. The lockers 136 and 138 can be coupled to a locker interface 134. The locker interface 134 can be configured to receive inputs from a user 105, who may be placing a product into a locker or conversely picking up a product. The locker interface can include at least one output device, such as one or more displays, and one or more input devices, such as a keyboard, mouse, touchscreen, camera, and microphone. The locker system 130 can also include a locker server 132, coupled to the locker interface 134. In some cases, the lockers 136 and 138 can also be coupled directly to the locker server 132. The locker server 132 can be configured to store information about the contents in the lockers 136 and 138, facilitate instructions and access additional information from a marketplace system 120 in a networked system 102, and transmit information to the networked system 102, among other functions.

In addition, the network architecture 100 may include one or more user devices 110 and 112. Examples of user devices 110 and 112 may include a mobile phone of a user 105. In some example embodiments, the user devices 110 and 112 may be the user's 105 own device, with one or more applications installed configured to interface with the locker system 130 or the networked system 102. In other cases, the devices 110 and 112 may be a mobile device operated by a courier or a delivery company, or other entity acting on behalf of a buyer or seller to interface with the locker system 130. Other examples of user devices 110 and 112 may include, but are not limited to, mobile phones, desktop computers, laptops, portable digital assistants (PDAs), smart phones, tablets, ultra books, netbooks, laptops, multi-processor systems, microprocessor-based or programmable consumer electronics, game consoles, set-top boxes (STBs), wearable devices, or any other communication device that a user 105 may utilize to interact with other aspects of the network architecture 100. In some example embodiments, a web client 106 (e.g., a browser, such as the Internet Explorer® browser developed by Microsoft®) or a programmatic client 108 may reside on respective user devices 110 and 112. The web client 106 and the programmatic client 108 may be configured to interface with various aspects of the network architecture 100 via a network 104, such as the Internet or a local wireless network associated with the network architecture 100. In some embodiments, the user devices 110 and 112 may comprise a display module (not shown) configured to display information (e.g., in the form of user interfaces) and images. In further embodiments, the user device 110 may comprise one or more of touch screens, accelerometers, gyroscopes, cameras, microphones, global positioning system (GPS) devices, and so forth.

The network architecture 100 may also include a networked system 102 configured to manage transactions and communications between various aspects of the network architecture 100, such as user devices 110 and 112, and the locker system 130. In some example embodiments, the networked system 102 may facilitate a network-based marketplace system 120, providing server-side functionality via a network 104 to the user devices 110 and 112, and locker system 130. An application program interface (API) server 114 and a web server 116 may be coupled to, and provide programmatic and web interfaces respectively to, one or more application servers 118. The application servers 118 may host one or more marketplace systems 120, which may comprise one or more modules or applications and which may be embodied as hardware, software, firmware, or any combination thereof. The application servers 118 are, in turn, shown to be coupled to one or more database servers 124 that facilitate access to one or more information storage repositories or database(s) 126. In some example embodiments, the databases 126 are storage devices that store information related to products either already stored in the locker system 130 or otherwise available to be stored in the locker system 130, account profiles about the user 105, product listings, and statistics about the quality of products passing through the locker system 130, as some examples.

The marketplace system(s) 120 may provide a number of marketplace functions and services to users 105 that interface with the networked system 102. For example, the marketplace system(s) 120 can provide information for products for sale or at auction facilitated by the marketplace system(s) 120 and displayable in user devices 110 and 112, a location of the particular locker storing a user's 105 product in the locker system 130, and statistics about the quality of the products stored in the locker system 130 by a user 105. The marketplace system(s) 120 can also facilitate the purchase of products in the online marketplace that can later be delivered to buyers through the locker system 130.

The web client 106 can access the various marketplace system(s) 120 and, in some cases, the locker system 130, via the web interface supported by the web server 116. Similarly, the programmatic client 108 can access the various services and functions provided by the marketplace system(s) 120 and, in some cases, the locker system 130, via the programmatic interface provided by the API server 114. The programmatic client 108 may, for example, perform batch-mode communications between the programmatic client 108 and the networked system 102.

While the marketplace system(s) 120 is shown in FIG. 1 to form part of the networked system 102, it will be appreciated that, in alternative embodiments, the marketplace system(s) 120 may form part of a payment service that is separate and distinct from the networked system 102.

Further, while the client-server-based network architecture 100 shown in FIG. 1 employs a user-server architecture, the present inventive subject matter is, of course, not limited to such an architecture, and may equally well find application in a distributed, or peer-to-peer, architecture system, for example. The various marketplace system(s) 120 may also be implemented as standalone software programs, which do not necessarily have networking capabilities.

Figure 2:
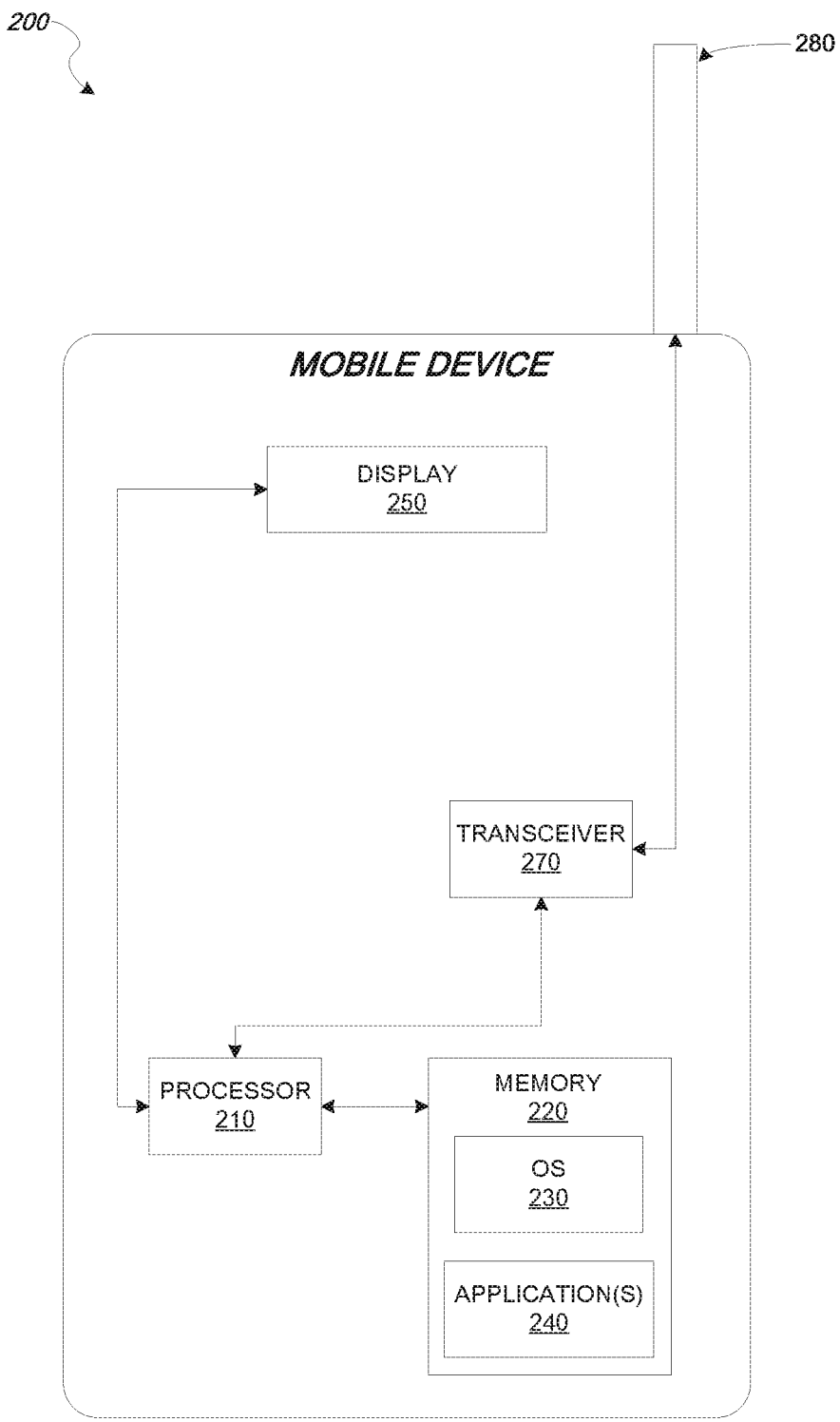
FIG. 2 is a block diagram illustrating a mobile device suitable for interfacing and communicating with the system of lockers, according to some example embodiments.

Referring to FIG. 2, a block diagram illustrating a mobile device 200 configured to interface and communicate with various aspects of the network architecture 100 is presented, according to some example embodiments. Examples of the mobile device 200 may include a tablet or other device owned and controlled by a buyer or seller of a product offered in an online marketplace. In some example embodiments, the mobile device 200 may be configured it to interface with the network system 102 or locker system 130.

The mobile device 200 can include an antenna 280 that can receive and transmit signals to and from the networked system 102. In some cases, various commands and information can be sent to and passed on from the mobile device 200, via antenna 280, through the networked system 102 to various other aspects of the network architecture 100. Antenna 280 can be coupled to a transceiver 270. The transceiver 270 may be configured to both transmit and receive cellular network signals, wireless data signals, or other types of signals via the antenna 280, including information related to conducting consumer transactions in the network architecture 100.

The mobile device 200 can also include a display 250. The display 250 may be configured to display information relevant to the user's 105 interactions with the locker system 130. This information can include, for example, a location of the locker containing the stored product, access code information for accessing the locker, notice information for informing a buyer the product is stored in a locker, and various information related to conducting a purchase of the product in an online marketplace. The display 250 can be coupled to a processor 210, which can process and generate the graphical information for display in the display 250. In some example embodiments, the display 250 can include touchscreen or touch data functionality, in that the user 105 can interface with a graphical user interface (GUI) displayed on the display 250 via some kind of tactile input.

The data from the display 250 and transceiver 270, and other input modules, not shown, may be processed by processor 210. The processor 210 may be any of a variety of different types of commercially available processors suitable for the mobile devices 200 (e.g., an XScale architecture microprocessor, a. Microprocessor without Interlocked Pipeline Stages (MIPS) architecture processor, or another type of processor). The processor 210 may be configured to operate one or more applications 240, which may be configured to interface and communicate with various aspects of the network architecture 100.

A memory 220, such as a random access memory (RAM), a Flash memory, or other type of memory, is typically accessible to the processor 210. The memory 220 may be adapted to store an operating system (OS) 230, as well as the application(s) 240, such as a mobile application for interfacing with a locker system 130.

The processor 210 may be coupled, either directly or via appropriate intermediary hardware, to the display 250 and to one or more input/output (I/O) devices (not shown), such as a keypad, a touch panel sensor, a microphone, a controller, a camera, and the like. Similarly, in some embodiments, the processor 210 may be coupled to the transceiver 270 that interfaces with an antenna 280. In some example embodiments, the processor 210 may include a plurality of processors or modules configured to perform various operations according to aspects of the present disclosure.

Figure 3:
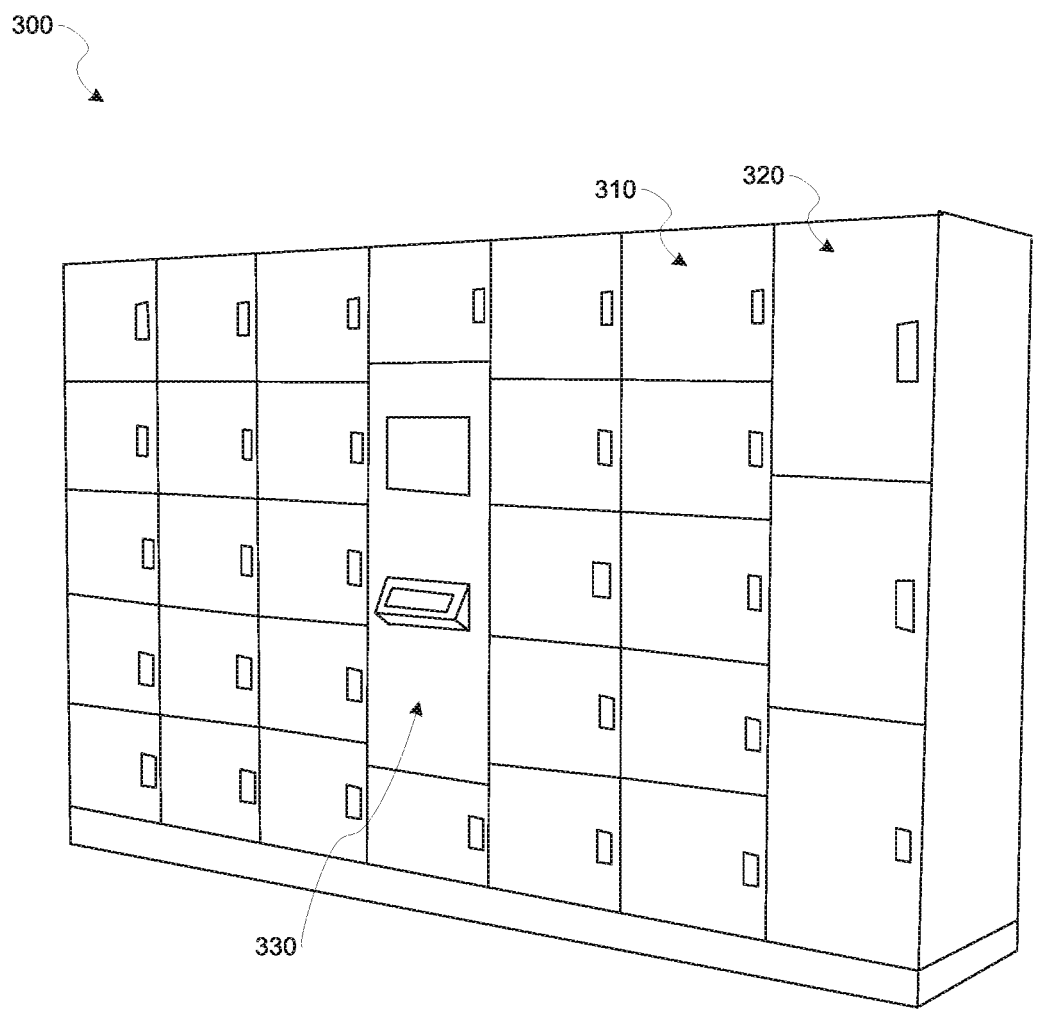
FIG. 3 is an illustration of a locker system, according to some example embodiments.

Referring to FIG. 3, illustration 300 shows an example locker system configured to facilitate standardized shipping and management of products sold in an online marketplace, according to some example embodiments. The system of lockers can include many lockers in various sizes, such as lockers 310 and 320. The locker system can also include a user interface console 330, configured to accept user inputs for registering products to be placed into lockers, accept inputs to open lockers from buyers, and in some cases facilitate product listings to set up a product to be sold while stored in the lockers. The user interface console 330 can be consistent with the descriptions about locker interface 134. In some cases, the locker system in illustration 300 can also be connected to a locker server, not shown, which may be consistent with the locker server 132. In some example embodiments, the locker system can be in communication with the marketplace system and can help facilitate at least part of the transaction process between a buyer and seller participating in an online marketplace. The locker system can be installed in various places, including in malls, in separate stores or buildings, along the street, or outside in parks or other public areas. The actual look and size of the locker system can vary, and embodiments are not so limited.

Figure 4:
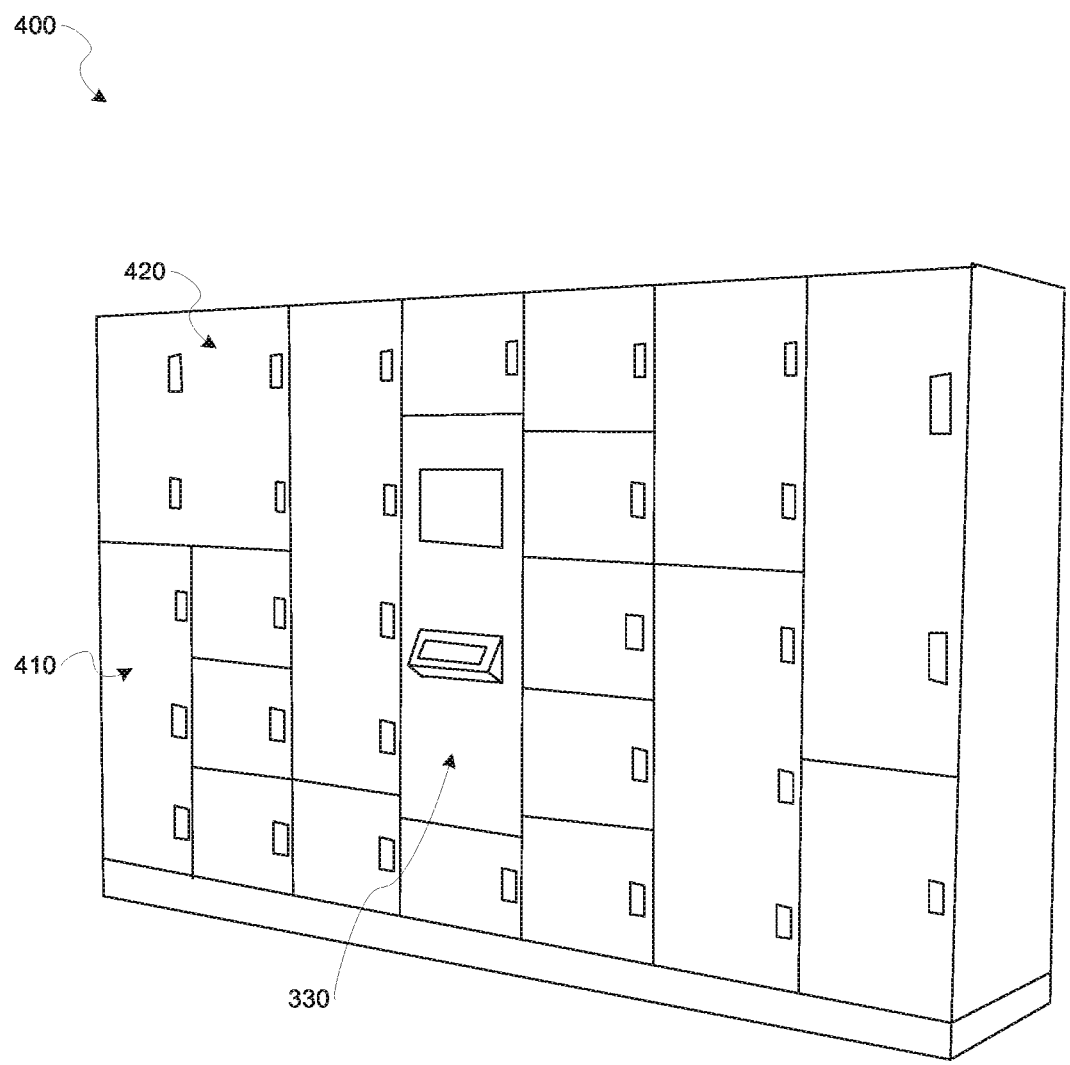
FIG. 4 is an illustration of a modified locker system, according to some example embodiments.

Referring to FIG. 4, illustration 400 shows how the example locker system can be reconfigured to combine the spaces of multiple lockers to increase the size of the lockers to fit larger items, according to some example embodiments. For example, when a user wishes to access one of the lockers, the user can first interface with console 330 to specify, among other piece of information, the estimated size of the package to be placed in one or more locker spaces. Based on the input, the console 330 can release one or more locks between the panels of the locker spaces, thereby allowing the user to reconfigure the panel spaces in between the lockers. In addition, the console 330 can release a series of locks fastening the hinges of the doors to the locker frame, while also releasing a series of bars or other fasteners to connect the locker doors to each other. In this way, certain locker doors will be fastened to other locker doors while having their hinges released from the locker frame, thereby allowing the user to configure the locker system to have a larger door for his item. In some example embodiments, the locker system can automate some or all of this process after the user has specified the size of the locker for his item. Thus, example larger locker doors 410 and 420 may be possible to be reconfigured in some example embodiments.

Figure 5:
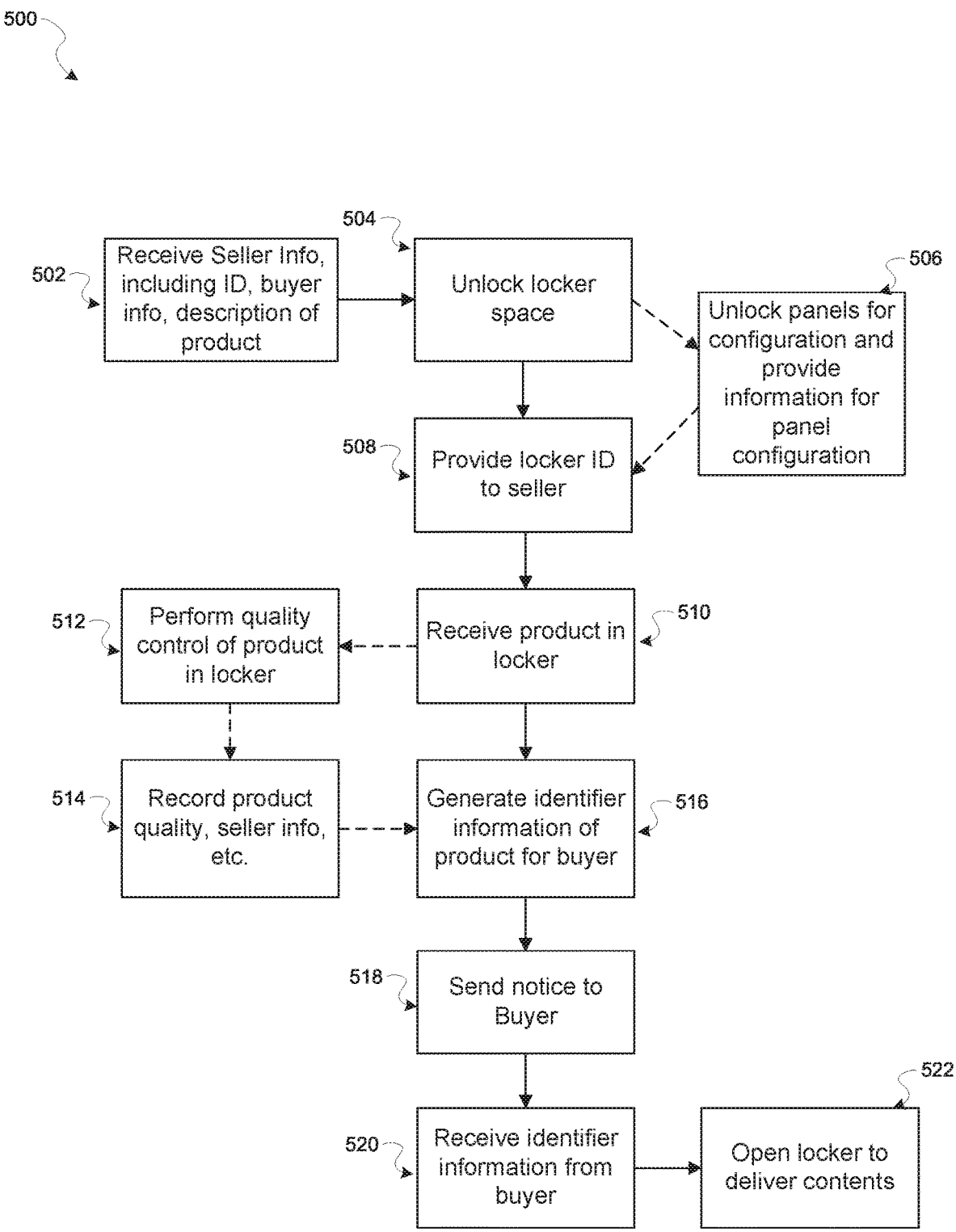
FIG. 5 is a flowchart describing example operations of merchants associated with the online marketplace for standardizing shipping using the system of lockers, according to some example embodiments.

Referring to FIG. 5, process flowchart 500 shows an example methodology for managing distribution of products from an online marketplace using a system of lockers, according to some example embodiments. The process flowchart 500 may be performed by a server or processor controlling the locker system, such as the locker server 132. In some cases, the locker system can be controlled and managed remotely by a networked system 102 through a network 104. Here, process flowchart 500 describes an example process for facilitating the distribution of a sold product of the seller which is ultimately delivered into the hands of a buyer.

At block 502, a seller of a product or a person acting on behalf of the seller of the product may enter information into the locker system, such as through the locker interface 134 or console 330. The locker system may receive information about a seller including, for example, an account identifier (ID) or username of the seller associated with the online marketplace. The locker system may also receive information about the buyer, such as the account ID or username of the buyer associated with the online marketplace, or some other identifier about the buyer. In addition, the locker system may also receive a description of the product, including any unique identifying information that may be associated with the online marketplace, approximate size of the product, a condition the product is in (e.g., new, used, very good, excellent), and the price the product sold for. In some cases, the locker system may receive this information from a centralized database associated with the online marketplace, such as through database(s) 126, where the seller may have entered this information prior to arriving at the locker system. In some cases, some or all this information can be entered from a mobile device carried by the seller or agent of the seller, such as mobile device 200 or devices 110 or 112. Also, the seller or agent of the seller may enter information at the locker system to signal that the seller or agent of the seller has arrived to deliver the package.

At block 504, after the locker system has received confirmation that the seller or seller's agent is present, the locker system may unlock one or more locker spaces for the seller's product. In some cases, at block 506, one or more panels and associated locker doors can be unlocked to allow reconfiguration for resizing the locker space in order to fit the product, in some example embodiments. An example process to release a series of locks, panels, and/or hinges, is described in FIG. 4. In some cases, additional instructions for finalizing the reconfiguration can be sent to the seller, either displayed at the locker interface 134, or displayed at the seller's mobile device 200. At block 508, the locker system can also provide the locker location to the seller in the form of a locker number or other kind of locker ID.

At block 510, the locker system may receive the product in the specified locker. In some cases, the locker system can detect when the product has entered the locker space. For example, there can be one or more motion sensors, laser sensors, or other types of sensors configured to detect when an object has entered the locker storage space. In some cases, the sensors may be similar to sensors used to detect bags and grocery products in self-checkout terminals at grocery stores.

In some example embodiments, at block 512, the locker system can perform quality control procedures of the product in the locker. For example, one or more image recording modules, such as digital cameras, can be installed in or around the walls of the locker system. The locker system can be configured to take a picture of the product in the locker space in order to examine or record the state of the product as it entered the locker. In some cases, the product may not be wrapped in any package so that the product can be better examined for quality when it enters the locker.

In some example embodiments, other types of quality control can be performed, such as accessing the seller's history for selling items. Other examples of quality control functionality of the locker system can include measuring a disclosing product dimensions or packaging of the product. The disclosed dimensions can be compared to listed product descriptions as a check against some fake products. In some example embodiments, higher resolution cameras or other image recording devices can provide more detailed images of the products, allowing for more transparency and confidence in the product for the recipient of the product. In addition, the online marketplace system can have more control over the captured images of the product itself, since the image recording devices in the locker system are more likely to be controlled by the online marketplace. Thus, the online marketplace can provide a more uniform and reliable quality control process to both sellers and buyers, rather than rely on user generated pictures or other details that may or may not be fraudulent. In addition, in some example embodiments, the locker system can facilitate facial recognition or other unique identification of the seller, the buyer or their agents. For example, the locker interface 134 can be equipped with a scanner to detect a person's face, eyes, or fingerprints. In some cases, this identifying information about a person could be previously stored in the database 126 of the online marketplace and can be cross-checked with the identifying information obtained at the locker system. In other cases, when no previous information is available, the locker system can record this information and associate it with the locker transaction for tracking purposes.

In some example embodiments, at block 514, the locker system can record the quality of the product, any new seller information, and other relevant metadata to confirm the delivery of the package into the locker. For example, a timestamp for the transaction can be recorded, and multiple snapshots of both the product and the person dropping off the package can be saved at the time of the transaction. In general, information can be recorded about the transaction to confirm the state of the product at the time the product was dropped off into the locker system. In addition, this information can be compiled into a series of statistics that can be used to measure the quality of the seller's products. This can be used to measure the reliability and performance of the online marketplace system's associated merchants, the information of which can be passed on to the buyers to inform them how reliable the seller might be. In more drastic cases, the online marketplace system may disqualify or penalize a seller for supplying poor quality products, based on this compiled information.

At block 516, once the product has been successfully settled into the locker space, the locker system may generate identifier information of the product for the buyer. For example, the locker system may generate a product number or access code to uniquely identify the product. The locker system might also generate a password or some kind of passcode associated with the product. At block 518, the locker system may send notice to the buyer that the product is ready to be picked up. The locker system may transmit the notice along with any access code information through the network 104 to a buyer's mobile device 110 or 112, for example. In some cases, it is noted that the seller may not receive any access code information that the buyer has been given, and so once the product is placed in the locker, the seller may not have an opportunity to modify the delivery.

At block 520, after the buyer has received the information and arrived at the locker system, the locker system may receive access code information or other identifying information to indicate that the buyer is present at the lockers. For example, the buyer may enter the access code information at the console 330. As another example, wireless sensors, such as Bluetooth® sensors or barcode readers, may receive a signal from the buyer's mobile device, with the signal being associated with the access code. At block 522, having received the identifier information from the buyer, the locker system may open or unlock the locker containing the buyer's purchased product.

In some example embodiments, the methodology presented herein may be conducted remotely from the lockers itself, such as through the network 104 by the networked system 102. In some example embodiments, the same system that manages the online marketplace may be capable of performing the methodology described herein.

Figure 6:
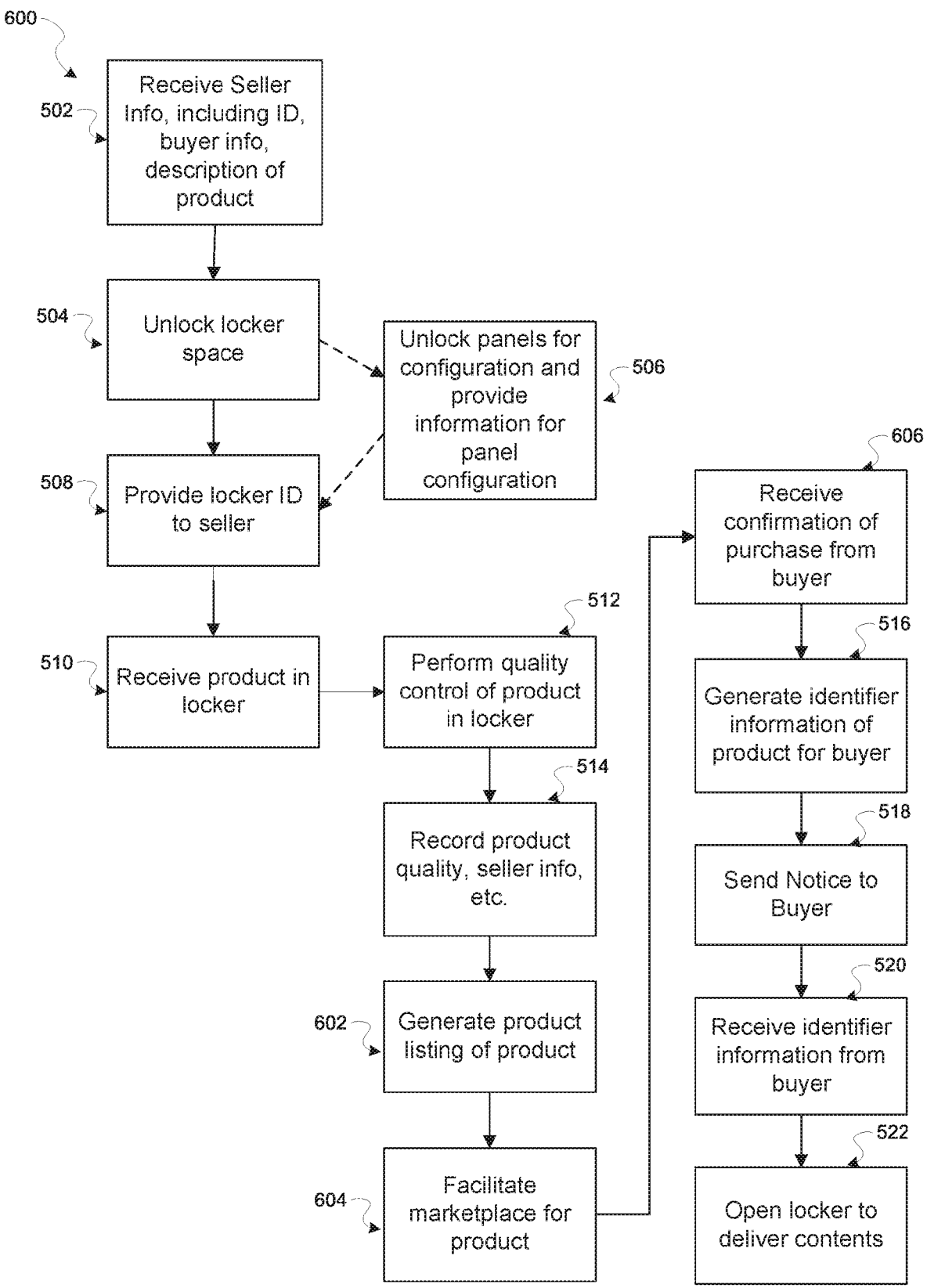
FIG. 6 is a flowchart describing additional example operations of merchants associated with the online marketplace for standardizing shipping using the system of lockers, according to some example embodiments.

Referring to FIG. 6, process flow chart 600 illustrates a modified methodology for performing various methods, according to some example embodiments. Here, for example, in addition to performing a number of steps from the seller to receive the product and to examine the quality of the product at the locker system, the locker system can also facilitate the sale of the product itself while it is stored in the locker. In this example, the steps in blocks 502-514 may be performed similarly as in FIG. 5. In other words, the locker system can receive the seller's information, description of the product, and also the product into one of the locker spaces that may or may not be reconfigured in size.

Once inside the locker space, at block 602, the seller may desire to set up a product listing to sell the product, using the locker space as the backdrop for presenting the product in a display in the online marketplace. For example, the locker space inside may include one or more cameras and have white walls suitable for taking unobstructed pictures of the product. The seller may not feel like he has a suitable backdrop within his control to set up a presentable display of the product. Instead, the online marketplace controlling the locker system may have quality presentation space in at least some of the lockers. Thus, the seller may prefer to use the locker system to assist in setting up a product display for his product. In addition, using either the interface at the locker system, such as console 330, or an application on the seller's mobile device, the seller can also easily enter in the needed information to set up the product listing.

At block 604, the locker system may then help facilitate the sale of the product in the online marketplace. In some example embodiments, the sale can include an online auction, while in other cases, the sale can include a normal fixed-price listing. At this point, in some cases, the seller need not be involved in the remaining parts of the transaction to a buyer, as the product is already stored in the locker and the locker system is helping to facilitate the sale of the product. Certainly, in other cases, the seller may wish to remove his product from sale, and the locker system can facilitate that by providing an access code of the locker to the seller while the product is still up for sale.

At block 606, the locker system can receive confirmation that a buyer has purchased the product, either through normal fixed-price means or by being the winning bidder of an auction. From here, the processes described in blocks 516-522 may be performed to complete the process of delivering the product to the buyer. In some cases, in the event that the buyer is not located in the same geographic area as the locker system, a courier or agent of the buyer can pick up the product, and place it in a locker near the buyer's residence, or deliver the package using normal delivery means (e.g., USPS, FedEx, and the like).

Figure 7:
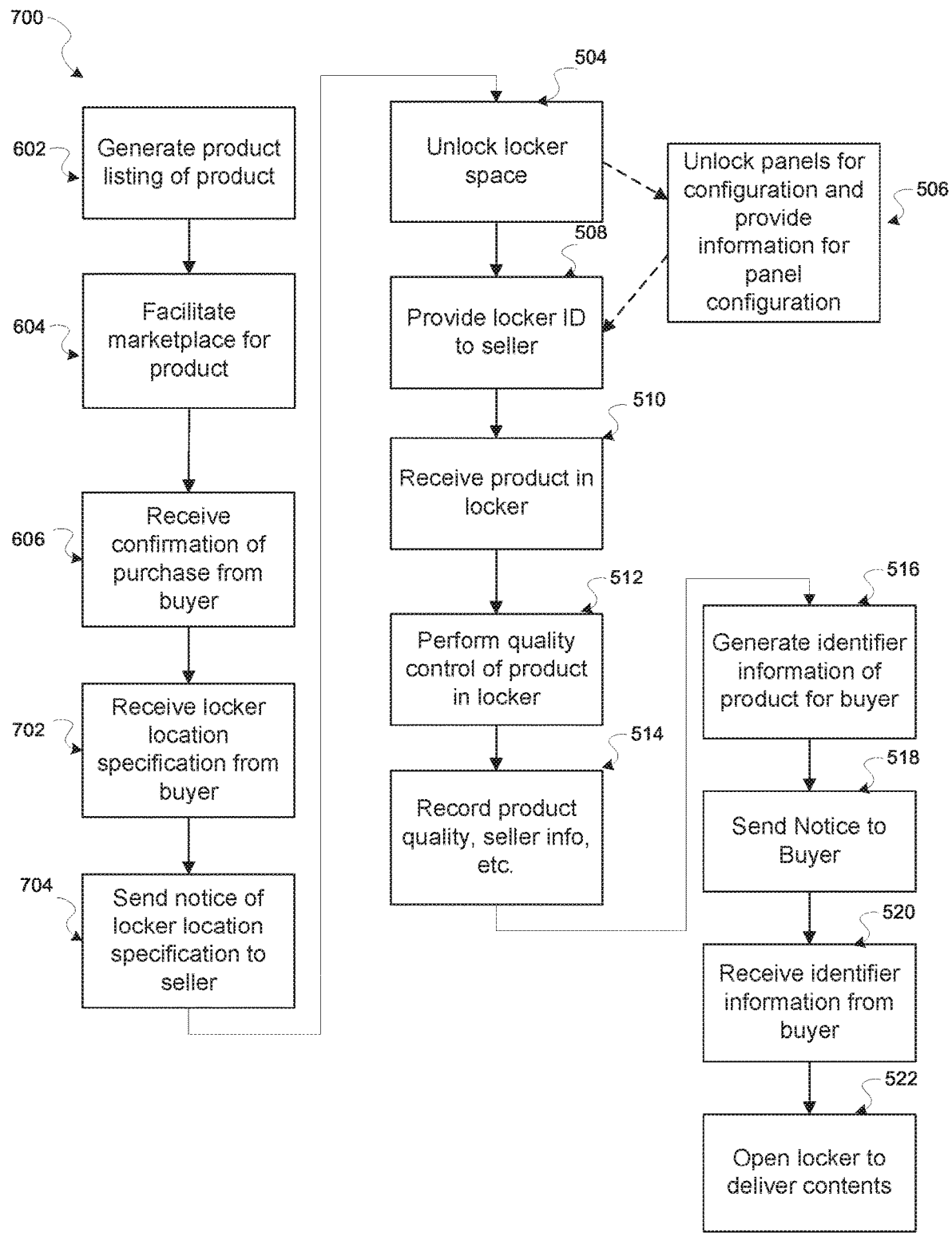
FIG. 7 is a flowchart describing yet other example operations of merchants associated with the online marketplace for standardizing shipping using the system of lockers, according to some example embodiments.

Referring to FIG. 7, process flow chart 700 illustrates another modification for managing products through the use of the locker system, according to some example embodiments. Here, the buyer may specify a location of a nearby locker system to which the purchased product is to be delivered. In this case, the example process starts with the product being placed in a product listing in the online marketplace. The processes described in blocks 602-606 or analogous steps may be performed first.

At block 702, after the buyer has confirmed purchase of the product, the buyer can specify to which locker system he may desire the purchased product to be delivered. For example, an array of these locker systems may be installed in various locations throughout a city or throughout a state, allowing the buyer local access to the particular locker system. If the buyer does not desire to wait around for a courier to deliver a package requiring his signature at his doorstep, the buyer can instead opt to have the package delivered into one of the locker spaces in a nearby locker system, which can then allow the buyer to pick up the product at his convenience. Thus, the locker system can receive a locker location specification from the buyer. In some cases, the networked system 102 can be the entity who receives this information, and can then transmit this information to the relevant locker systems (e.g., the one locker system containing the product and the other to which the product will be delivered to).

At block 704, in some cases, notice can also be sent to the seller regarding the locker specification provided by the buyer. In some cases, the product may not actually be contained in any locker system to begin with and instead may simply be in control with the seller. The seller can then either drop off the package to the specified locker system or can have the package delivered to the locker system via a courier.

From here, in some example embodiments, the seller or agents of the seller or courier authorized to act on behalf of the seller can perform the steps previously mentioned to deliver the package into the specified locker. The process steps described in blocks 504-514 can be example steps to outline this process. Once the package has been delivered to the designated locker space, the process steps described in blocks 516-522 can be performed to enable the buyer to pick up the package and complete the transaction.

In some example embodiments, the described processes can also be used to facilitate returns of items through delivery to the locker systems. For example, the term "seller" shown in FIGS. 3-7 can be substituted for a buyer who is returning an item. Similar processes would apply, including performing quality control examinations on the returned items, in order to properly keep track of the status of the returned product as it transitions to changing hands. A courier may be notified to pick up the returned item stored in the locker space and deliver it to another locker system of the original seller's choosing, or may deliver it to the seller directly using conventional delivery means.

In some example embodiments, the returned packages can also be tracked for quality and statistics relating to the seller of those packages. For example, the returned packages can be traced back to the original seller using receipts and other purchase confirmation information. The returned packages can then be assessed for quality once they are stored in the lockers again. The number of returns or the rate of returns of a particular seller can then be tabulated, and a rating based on these statistics can be assessed for each seller.

Figure 8:
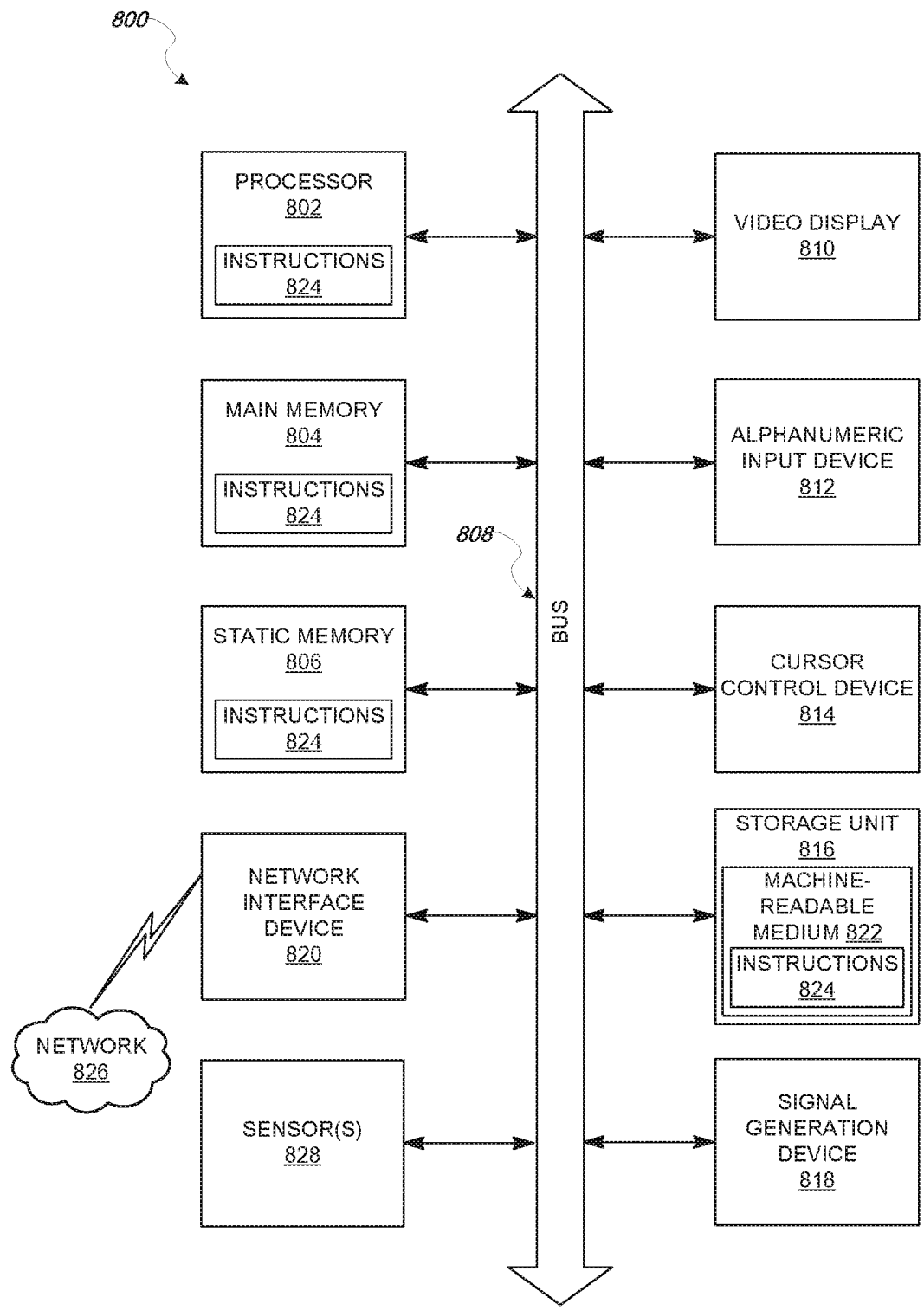
FIG. 8 is a block diagram illustrating components of a machine, according to some example embodiments, able to read instructions from a machine-readable medium and perform any one or more of the methodologies discussed herein.

Referring to FIG. 8, the block diagram illustrates components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer system (e.g., a computer) within which the instructions 824 (e.g., software, a program, an application 140, an applet, an app, or other executable code) for causing the machine 800 to perform any one or more of the methodologies discussed herein may be executed, in whole or in part.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may include hardware, software, or combinations thereof, and may as examples be a server computer, a client computer, a personal computer (PC), a tablet computer, a laptop computer, a netbook, a cellular telephone, a smartphone, a STB, a PDA, a web appliance, a network router, a network switch, a network bridge, or any machine capable of executing the instructions 824, sequentially or otherwise, that specify actions to be taken by that machine. Further, while only a single machine 800 is illustrated, the term "machine" shall also be taken to include any collection of machines 800 that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824, such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include one or more sensors 828, suitable for obtaining various sensor data. The machine 800 may further include a video display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein, including, for example, any of the descriptions of FIGS. 1-7. The instructions 824 may also reside, completely or at least partially, within the main memory 804, within the processor 802 (e.g., within the processor's cache memory), or both, before or during execution thereof by the machine 800. The instructions may also reside in the static memory 806.

Accordingly, the main memory 804 and the processor 802 may be considered machine-readable media 822 (e.g., tangible and non-transitory machine-readable media). The instructions 824 may be transmitted or received over a network 826 via the network interface device 820. For example, the network interface device 820 may communicate the instructions 824 using any one or more transfer protocols (e.g., Hypertext Transfer Protocol (HTTP)). The machine 800 may also represent example means for performing any of the functions described herein, including the processes described in FIGS. 1-7.

In some example embodiments, the machine 800 may be a portable computing device, such as a smart phone or tablet computer, and have one or more additional input components (e.g., sensors or gauges), not shown. Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 822 able to store data temporarily or permanently and may be taken to include, but not be limited to, RAM, read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 822 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 802) may be configured by software (e.g., an application 140 or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 802 or other programmable processor 802. It will be appreciated that the decision to implement a hardware module mechanically, in dedicated and permanently configured circuitry, or in temporarily configured circuitry configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 802 configured by software to become a special-purpose processor, the general-purpose processor 802 may be configured as respectively different special-purpose processors (e.g., comprising different hardware modules) at different times. Software (e.g., a software module) may accordingly configure one or more processors 802, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions described herein. As used herein, "processor-implemented module" refers to a hardware module implemented using one or more processors 802.

Similarly, the methods described herein may be at least partially processor-implemented, with a processor 802 being an example of hardware. For example, at least some of the operations of a method may be performed by one or more processors 802 or processor-implemented modules. As used herein, "processor-implemented module" refers to a hardware module in which the hardware includes one or more processors 802. Moreover, the one or more processors 802 may also operate to support performance of the relevant operations in a "cloud computing" environment or as a "software as a service" (SaaS). For example, at least some of the operations may be performed by a group of computers (as examples of machines 800 including processors), with these operations being accessible via a network 826 (e.g., the Internet) and via one or more appropriate interfaces an API).

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 800. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 800 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   one or more lockers configured to store one or more products;
   one or more sensors coupled to the one or more lockers;
   one or more processors coupled to the one or more sensors and the one or more lockers, the one or more processors being configured to perform operations comprising:
   providing sensor data from the one or more sensors, the sensor data comprising item information for use in generating a product listing of a first product of the one or more products stored in the one or more lockers;
   determining an estimated size of the first product;
   automatically adjusting one or more physical components of the one or more lockers based on the estimated size of the first product to enable a seller to reconfigure storage space for the first product in the one or more lockers, the automatically adjusting comprising:
   generating instructions for reconfiguring the one or more lockers; and
   transmitting the instructions for reconfiguring the one or more lockers to a mobile device associated with the seller of the first product; and
   comparing a set of item information input by the seller of the first product with the item information captured by the one or more sensors of the one or more lockers.

2. The system of claim 1 wherein the operations further comprise:
   accessing information associated with a buyer of the first product purchased from the product listing; and
   generating access code information for the buyer to enable access to a locker storing the first product.

3. The system of claim 2 further comprising:
   a transmitter coupled to the one or more processors and configured to transmit the access code information to the buyer;
   the operations further comprising:
   accepting the access code information inputted from the buyer; and
   opening the locker storing the product in response to receiving the access code information.

4. The system of claim 1, wherein the one or more physical components comprise at least one of floor and wall panels dividing locker spaces of the one or more lockers, or door panels, further comprising operations for:
   measuring, using the one or more sensors of the system, product dimensions of the first product; and
   comparing the product dimensions to listed product descriptions to detect a fake product.

5. The system of claim 1, wherein the one or more lockers include adjustable door panels configured to be unhinged and attached to other door panels to form a single larger door panel of a larger locker space, further comprising operations for using facial recognition of the system to identify the seller or a buyer associated with the product listing.

6. The system of claim 1, wherein the operations further comprise:
recording a packaging quality of the first product stored in the locker; and
generating a rating of the seller based on the recorded packaging quality of the first product stored in the locker.

7. The system of claim 1 further comprising operations for:
determining that identifying information about a user associated with a locker transaction has not been previously stored;
in response to determining that the identifying information about the user has not been previously stored, recording facial recognition information of the user; and
associating the recorded facial recognition information of the user with the locker transaction.

8. The system of claim 1, wherein the operations further comprise:
generating and initiating publication of the product listing of the first product stored in the locker via a network interface device; and
facilitating a sale of the first product stored in the locker via the product listing and the sensor data.

9. The system of claim 8, wherein the generating the product listing of the first product stored in the locker includes recording one or more images of the first product stored in the locker; and
transmitting the one or more images in response to a request received via a marketplace system.

10. The system of claim 1, wherein the operations further comprise:
selecting some of the one or more lockers to be used as a backdrop to capture an image of a product;
adding the backdrop within walls of the selected some of the lockers to create a quality presentation space;
capturing an image of the first product placed within the walls of a given locker of the selected some of the lockers, the image including the backdrop; and
generating the product listing for the first product using the captured image.

11. A method comprising:
storing one or more products within a system of one or more lockers, the one or more lockers comprising one or more sensors;
capturing sensor data associated with the one or more products using the one or more sensors;
determining an estimated size of the one or more products; and
automatically adjusting one or more physical components of the one or more lockers based on the estimated size of the one or more products to enable a seller to reconfigure storage space for the one or more products in the one or more lockers, the automatically adjusting comprising:
generating instructions for reconfiguring the one or more lockers; and
transmitting the instructions for reconfiguring the one or more lockers to a mobile device associated with the seller of a first product of the one or more products; and comparing a set of item information input by the seller of the first product with item information captured by the one or more sensors of the one or more lockers;
automatically generating one or more product listings for corresponding products of the one or more products stored within the one or more lockers using the sensor data; and
automatically initiating transmission of the one or more product listings to a server device in response to storage of the one or more products and capturing of the sensor data.

12. The method of claim 11 further comprising:
accessing information associated with a buyer of the first product of the one or more products within the system of the one or more lockers purchased from the one or more product listings; and
generating access code information for the buyer to enable access to a locker storing the first product.

13. The method of claim 12 further comprising:
transmitting, via a transmitter coupled to the one or more locker; the access code information to the buyer;
accepting the access code information inputted from the buyer; and
opening the locker storing the product in response to receiving the access code information.

14. The method of claim 11 further comprising:
measuring, using the one or more sensors of the system, product dimensions of the one or more products; and
comparing the product dimensions to listed product descriptions to detect a fake product.

15. The method of claim 11, further comprising:
selecting some of the one or more lockers to be used as a backdrop to capture an image of a product;
adding the backdrop within walls of the selected some of the lockers to create a quality presentation space;
capturing an image of the first product placed within the walls of a given locker of the selected some of the lockers, the image including the backdrop; and
generating a product listing for the first product using the captured image.

16. A non-transitory computer readable medium comprising instructions that, when executed by one or more processors of a system of adjustable lockers, cause the system of adjustable lockers to perform operations comprising:
receiving and storing one or more products within one or more lockers of the system of adjustable lockers, the one or more lockers each comprising one or more sensors;
capturing sensor data associated with the one or more products using the one or more sensors;
determining an estimated size of the one or more products; and
automatically adjusting one or more physical components of the one or more lockers based on the estimated size of the one or more products to enable a seller to reconfigure storage space for the one or more products in the one or more lockers, the automatically adjusting comprising:
generating instructions for reconfiguring the one or more lockers; and
transmitting the instructions for reconfiguring the one or more lockers to a mobile device associated with the seller of a first product of the one or more products; and
comparing a set of item information input by the seller of the first product with item information captured by the one or more sensors of the one or more lockers;

automatically generating one or more product listings for corresponding products of the one or more products stored within the one or more lockers; and automatically initiating transmission of the one or more product listings to a server device in response to storage of the one or more products and capturing of the sensor data.

17. The non-transitory computer readable medium of claim 16 wherein the instructions further cause the system of adjustable lockers to perform operations comprising:

recording a packaging quality of the first product stored in the locker; and initiating update of a rating of the seller based on the recorded packaging quality of the first product stored in the locker.

18. The non-transitory computer readable medium of claim 16 wherein the instructions further cause the system of adjustable lockers to perform operations comprising:

facilitating a sale of the first product stored in the locker via communicating the product listing and the sensor data to a marketplace server system.

19. The non-transitory computer readable medium of claim 16 wherein the instructions further cause the system of adjustable lockers to perform operations comprising:

receiving a request for information from a marketplace server system; and initiating transmission of image data for the first product in response to the request for information from the marketplace server system.

\* \* \* \* \*